Nov. 13, 1951   J. R. HEIDLOFF   2,574,969
TILTING VALVE MASTER CYLINDERS FOR HYDRAULIC BRAKES
Filed Dec. 20, 1948

INVENTOR.
JOSEPH R. HEIDLOFF
BY Clifford C. Bradbury
ATTORNEY

UNITED STATES PATENT OFFICE 2,574,969

TILTING VALVE MASTER CYLINDER FOR HYDRAULIC BRAKES

Joseph R. Heidloff, Detroit, Mich., assignor to Hydraulic Brake Company, Detroit, Mich., a corporation of California Application December 20, 1948, Serial No. 66,253

2 Claims. (Cl. 60—54.6)

This invention relates to master cylinders for hydraulic brake systems.

In hydraulic brake systems in common use, a small opening is provided through the top of the cylinder wall between the interior of the cylinder and the reservoir which is closed by the rubber cup washer upon the first movement of the piston in the cylinder. Ordinarily, even when made very quickly, the slight movement of the piston for closing this opening does not create a sufficient pressure in the master cylinder to force the rubber of the cup washer into the small opening, but there are occasions when the cup washer must go past the opening when there is a considerable fluid pressure in the master cylinder. This high pressure may occur when the master cylinder is used in a braking system provided with a so-called "NoRol" device for locking fluid under pressure in the wheel cylinders to prevent the vehicle on which the braking system is installed from rolling backwards if stopped on an upgrade.

My invention is an improvement upon the invention of Ludger E. LaBrie, set forth in his application for United States Letters Patent, Serial No. 27,389, filed May 17, 1948, in which application provision is also made for preventing damage to the master cylinder cup washer when a "NoRol" system is installed.

In accordance with my present invention, a valve opening toward the cylinder is located between the bore of the master cylinder and reservoir located above and adjacent the master cylinder, the piston in the master cylinder being provided with an extension carrying a flange, and adapted to engage the stem of the valve to tilt it on its seat and open it when the piston returns to its normal position.

In order that the valve may be non-leaking when it is closed, it has been found necessary that the valve seat be provided with a rubber or similar facing. Since on occasions the valve will be opened when the brake fluid is under very high pressure, it is necessary that the rubber facing for the valve be locked in its position more firmly than is possible if the rubber is merely snapped into its position due to its own elasticity.

In the LaBrie application above referred to, the rubber facing is locked onto the valve head whereas, in accordance with my invention, the rubber facing is locked onto the valve seat. In order to lock the rubber facing onto the valve head, the central part of the valve head was made of a separate piece from the outer part of the valve head and forcibly pressed through the valve head, the central portions having a slight enlargement at its valve face to lock the rubber facing into a groove in the valve head. With this arrangement, if a slight leak occurs between the portion forming the outer part of the valve and the portion forming the inner part, then fluid under high pressure will find its way under the rubber valve seat and will assist the rushing high pressure fluid in forcing the rubber valve facing out of its groove in the valve head.

In accordance with my invention, I place the rubber valve facing on the seat of the valve and hold it in place by a headed thimble which extends upwardly through the valve seat so that the space, if any, between the thimble and the valve seat communicates at its upper end with the low pressure fluid of the reservoir. The head of the thimble locks the rubber facing into a groove in the valve seat, the thimble being removable to replace the rubber facing if such replacement becomes necessary.

In accordance with the structure of my invention therefore, the inner portion of the rubber facing is subjected only to low pressure fluid, and the tendency of the rubber facing to be removed from its groove by a rush of high pressure fluid is decreased.

My invention is illustrated in the accompanying drawing, in which

Figure 1:
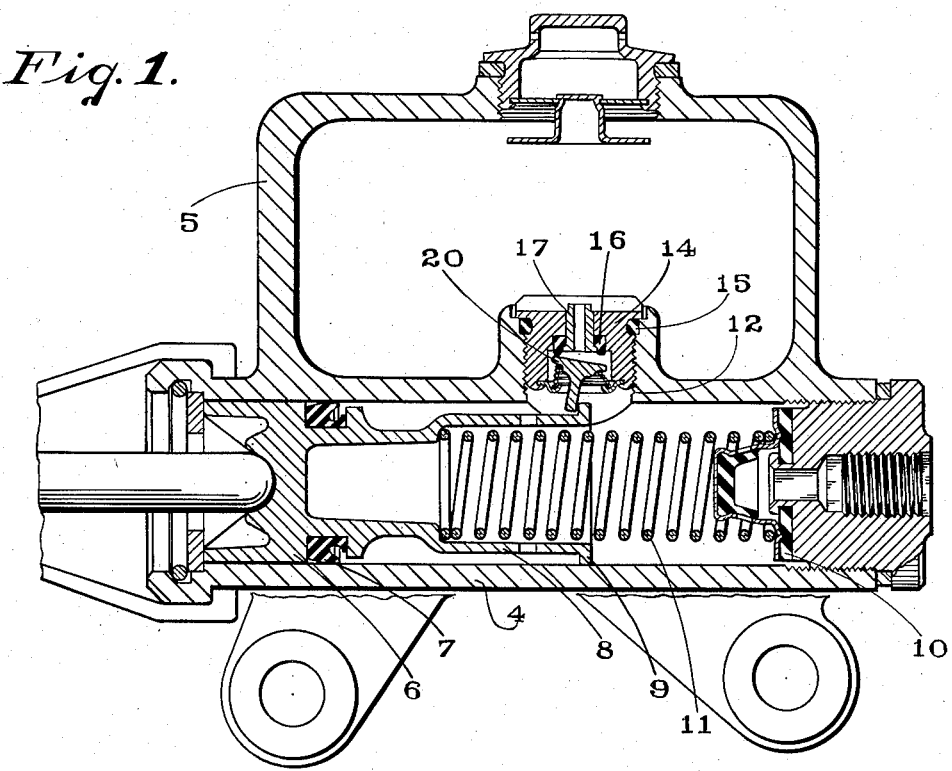
Fig. 1 is a section through a master cylinder and reservoir with the tilting valve shown in its normal or open position.

A master cylinder 4 supports an integrally cast reservoir 5. A piston 6 within the cylinder is provided with a packing 7, and with an extension 8, and carries a flange or abutment 9 substantially fitting the inner wall of the cylinder. The valve mechanism 10, located in the end of the cylinder, is of usual construction and forms no part of my present invention. A spring 11 urges the valve 10 on its seat, and urges the piston 6 to its normal position.

The tilting valve mechanism of my invention is located in a threaded opening 12, extending between the central part of the cylinder and the reservoir. A plug 14 is threaded into the opening 12 and sealed therein against fluid leakage by a ring washer 15. A rubber valve seat facing 16 is locked into place on the upper inner surface of the hollow plug 14 by a tubular thimble 17 which has a pressed fit at 18 in a cylindrical opening in the plug 14. The thimble 17 is provided with an enlarged head 19, which holds the rubber facing 16 in place in a cavity in the inner face of the plug 14. A tilting valve 20 is urged against the rubber facing 16, by a spring 21, seated on a spider 22, held into the lower portion of the plug 14 by stacking 23 at a plurality of positions around the opening in the plug 14. The spring 11 is of such strength as to overcome the spring 21 and tilt the valve on its seat.

Figure 2:
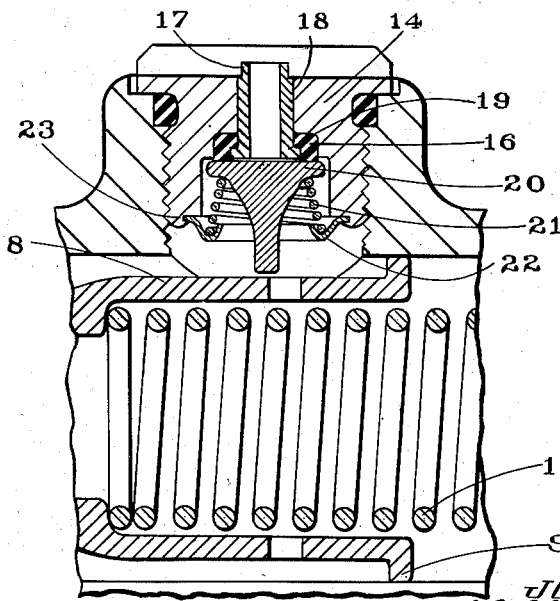
Fig. 2 is an enlarged section of the tilting valve shown in its closed position.

In operation, the reservoir and cylinder, and the wheel cylinder motors or other equipment to be operated by fluid pressure, are filled with brake fluid by the usual bleeding and pumping operation. When the piston 8 is in its normal position as shown in Fig. 1, the valve 20 is tilted to its open position by the abutment 9 at the end of the piston extension 8. The first movement of the piston on its compression stroke permits the spring 21 to untilt the valve 20 and press it against the rubber facing 16 as shown in Fig. 2. As the pressure increases, the valve 20 is moved upwardly until eventually the metal of the valve 20 strikes the lower face of the thimble 17 and the outer ring of the metallic valve seat.

Even a very slight leakage of brake fluid between the high pressure side of the valve 20 and the reservoir is objectionable. The inner and upper portion of the rubber facing contacts the boundaries of the opening 18 between the thimble 17 and the plug 14 and prevents fluid from passing from the high pressure cylinder to the reservoir even though the pressure of fluid may be sufficient to compress the rubber of the facing 16 away from its firm contact with the inner vertical cylindrical wall of the cavity in the plug 14 in which the rubber facing 16 is seated. Therefore, even if the thimble 17 fits loosely in its opening in the plug 14, no fluid can escape around the facing and into the opening between the thimble 17 and the plug 14. When the valve 20 is tilted at a time that fluid under high pressure is retained in the master cylinder, the flow of fluid past the rubber facing 16 will not force the facing out of its groove because the upper inner portion of the facing is subject only to low pressure fluid from the reservoir. The facing is therefore held in position not only by the head 18 of the thimble 17, but also by fluid pressure.

Although I have shown and described my invention with respect to certain details of construction, it is to be understood that modifications thereof are possible without departing from the spirit or scope of my invention.

I claim:

1. In a master cylinder for hydraulic brake systems, a reservoir for operating fluid, a piston in the cylinder, a spring in the cylinder for returning the piston to its normal position, there being a passageway from the reservoir into the cylinder beyond the pressure stroke of the piston, a valve for closing said passageway opening toward the cylinder and having a stem projecting into the cylinder, a spring tending to hold said valve on its seat, a rubber facing forming a part of the seat for said valve, a headed tubular thimble for holding the rubber facing in place, the piston being provided with an integral extension of less external diameter than the cylinder, and provided with an abutment at its extremity of diameter substantially filling the cylinder for engagement with the stem of said valve to tilt the valve when the piston is in its normal position, the first movement of the piston on its pressure stroke moving the abutment out of contact with the valve stem permitting the valve to seat under the influence of its spring.

2. In a combined master cylinder and reservoir, a piston in the cylinder, a sealing gasket surrounding the piston and movable therewith within the cylinder, there being an opening between the reservoir and the cylinder beyond the pressure stroke of the sealing gasket, a valve seating toward the reservoir for closing the opening during the pressure stroke of the piston, a rubber facing forming a part of the seat for said valve, the metallic portion of the valve seat having a groove therein, the entrance to the groove being narrower than the interior of the groove so that the rubber facing is locked in the groove, said valve having a stem protruding into the cylinder, the piston having an integral extension for engagement with said stem to tilt the valve and open it when the piston is in its normal position, a spring for the valve tending to close it, and a spring for the piston tending to return it to normal position, the spring for the piston being of a strength superior to that for the valve.

JOSEPH R. HEIDLOFF.

REFERENCES CITED

The following references are of record in the file of this patent:

UNITED STATES PATENTS

| Number | Name | Date |
| --- | --- | --- |
| 2,000,187 | Oliver | May 7, 1935 |
| 2,095,752 | LaBrie | Oct. 12, 1937 |
| 2,258,257 | Main | Oct. 7, 1941 |
| 2,314,553 | Palm | Mar. 23, 1943 |
| 2,369,104 | Frederickson | Feb. 6, 1945 |

FOREIGN PATENTS

| Number | Country | Date |
| --- | --- | --- |
| 539,095 | Great Britain | Aug. 27, 1941 |